United States Patent [19]

Sakuma

[11] Patent Number: 5,491,825
[45] Date of Patent: Feb. 13, 1996

[54] MICROPROCESSOR HAVING A FUNCTIONALLY MULTIPLEXED INPUT AND OUTPUT TERMINAL

[75] Inventor: Hajime Sakuma, Tokyo, Japan

[73] Assignee: NEC Corporation, Tokyo, Japan

[21] Appl. No.: 56,184

[22] Filed: May 3, 1993

[30] Foreign Application Priority Data

May 12, 1992 [JP] Japan .................................. 4-146686

[51] Int. Cl.$^6$ .............................. G06F 12/00; G11C 8/00
[52] U.S. Cl. ............................................. 395/775; 395/871
[58] Field of Search ................................. 395/775, 275; 327/18, 403

[56] References Cited

U.S. PATENT DOCUMENTS

| | | | |
|---|---|---|---|
| 4,573,120 | 2/1986 | Ichimiya et al. | 395/275 |
| 4,609,985 | 9/1986 | Dozier | 395/425 |
| 4,731,746 | 3/1988 | Nozeran et al. | 364/565 |
| 5,046,180 | 9/1991 | Ueda et al. | 365/189.03 |

Primary Examiner—Jack B. Harvey
Assistant Examiner—Jeffrey K. Seto
Attorney, Agent, or Firm—Whitham, Curtis, Whitham & McGinn

[57] ABSTRACT

A semiconductor integrated circuit is provided with a terminal functioning as a port terminal and a pulse circuit terminal, a port mode control register for storing data designating whether the terminal should function as the port terminal or the pulse circuit terminal, a port register for holding data to be externally output, a pulse circuit for outputting a pulse signal, a selector for supplying one of the outputs from the port register and the pulse circuit in response to the value held in the port mode control register, and a switching circuit coupled to the selector and set by a signal for writing data in the port register, for causing the selector to select the output from the port register regardless of the output from the port mode control register. When a voltage of the terminal is fixed to a predetermined voltage independent of a level of the output signal from the pulse circuit, predetermined data is written in the port register, and the switching circuit causes the selector to select the output from the port register.

15 Claims, 4 Drawing Sheets

FIG. 4
(PRIOR ART)
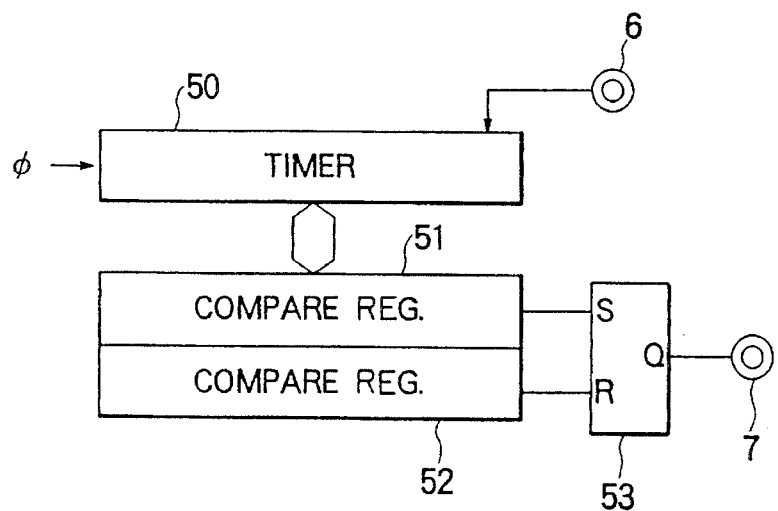
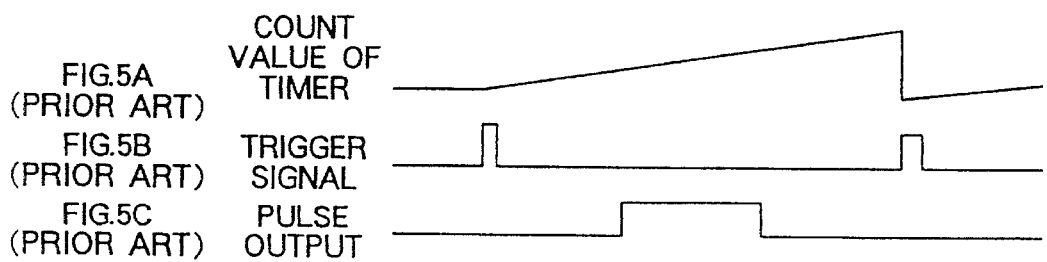
FIG.5A (PRIOR ART) COUNT VALUE OF TIMER
FIG.5B (PRIOR ART) TRIGGER SIGNAL
FIG.5C (PRIOR ART) PULSE OUTPUT
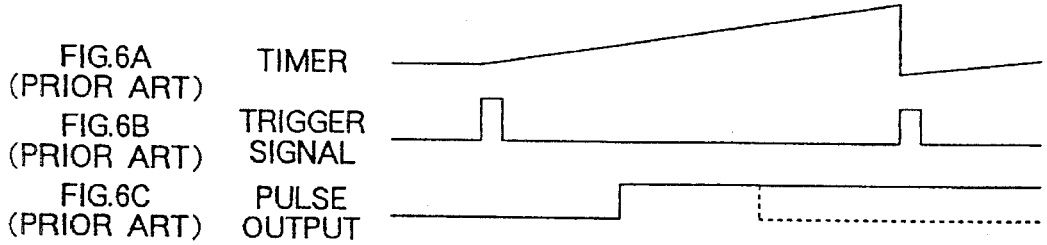
FIG.6A (PRIOR ART) TIMER
FIG.6B (PRIOR ART) TRIGGER SIGNAL
FIG.6C (PRIOR ART) PULSE OUTPUT
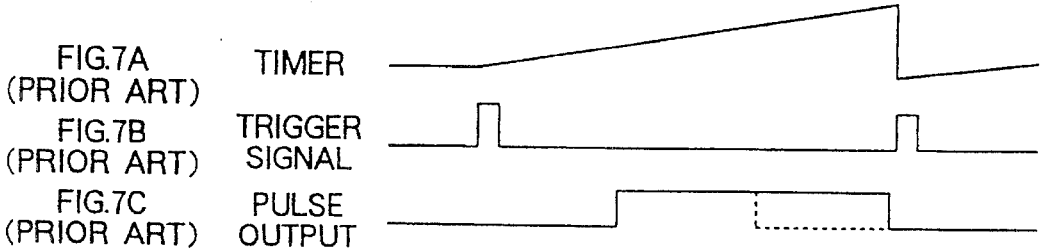
FIG.7A (PRIOR ART) TIMER
FIG.7B (PRIOR ART) TRIGGER SIGNAL
FIG.7C (PRIOR ART) PULSE OUTPUT

FIG. 4
(PRIOR ART)
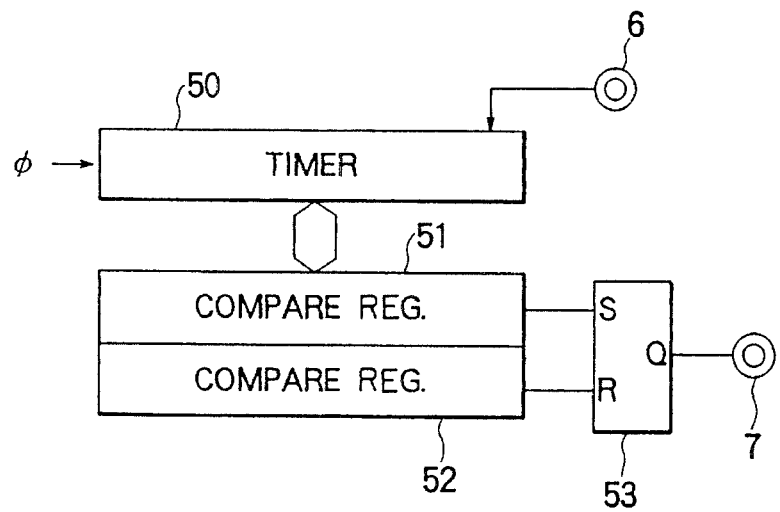
FIG.5A (PRIOR ART) — COUNT VALUE OF TIMER
FIG.5B (PRIOR ART) — TRIGGER SIGNAL
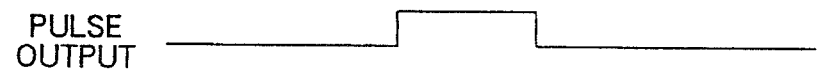
FIG.5C (PRIOR ART) — PULSE OUTPUT
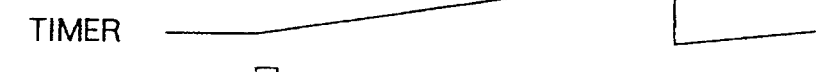
FIG.6A (PRIOR ART) — TIMER
FIG.6B (PRIOR ART) — TRIGGER SIGNAL
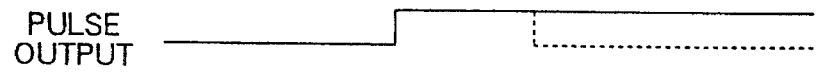
FIG.6C (PRIOR ART) — PULSE OUTPUT
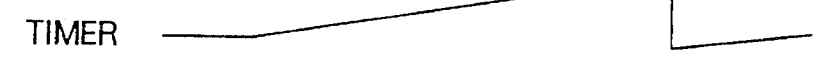
FIG.7A (PRIOR ART) — TIMER
FIG.7B (PRIOR ART) — TRIGGER SIGNAL
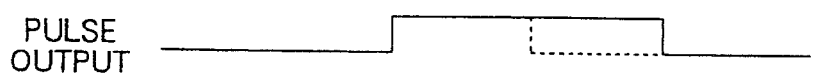
FIG.7C (PRIOR ART) — PULSE OUTPUT

MICROPROCESSOR HAVING A FUNCTIONALLY MULTIPLEXED INPUT AND OUTPUT TERMINAL

BACKGROUND OF THE INVENTION

1. Field of the Invention

The present invention relates to a microprocessor incorporating peripheral devices and, more particularly, to a microprocessor having a functionally multiplexed input and output terminal.

2. Related Art

A microprocessor is known in which peripheral and control devices such as a ROM, a RAM, a serial interface, a timer, an interrupt controller, and a port are integrated with a CPU (Central Processing Unit) on a semiconductor substrate. In a conventional microprocessor, a terminal is often shared (multiplexed) by a peripheral device and an input and output port (I/O port).

An example where a pulse circuit and an I/O port share the terminal will now be described, with reference to FIGS. 3 through 7C. FIG. 3 shows an internal arrangement of a microprocessor where the pulse circuit and the I/O port share the input and output (I/O) terminal. This microprocessor is provided with an internal bus 1, a port mode control register 2, a port mode register 3, a port register 4, a pulse generator 5, an I/O terminal 6, an input terminal 7, a selector 8, an NAND gate 9, and an inverter 10 for data input, an OR gate 11, a three-state buffer 12, and gates G1 through G5.

The port mode control register 2 is used to set the I/0 terminal 6 in a port mode (a mode in which the I/O terminal 6 serves as an I/O port terminal) or a pulse-output mode (a mode in which the I/O terminal 6 serves as an output terminal for the pulse generator 5). When an output of the port mode control register 2 is logic "0" and "1", the I/O terminal 6 is set in the port mode and the pulse output mode, respectively.

The port mode register 3 is used to designate an input mode or an output mode in units of bits when the I/O terminal 6 is set in the port mode. Each bit in the port mode register represents the output mode at logic "0" and the input mode at logic "1".

The port register 4 holds data to be output externally. The pulse generator 5 has an arrangement which is described later with reference to FIG. 4, and generates pulses having arbitrary pulse widths at arbitrary intervals.

The I/O terminal 6 serves both as an I/O terminal of the I/O port and the pulse output terminal of the pulse generator 5. The input terminal 7 receives a trigger signal to be supplied to the pulse generator 5. The selector 8 supplies an output from the port register 4 and an output from the pulse generator 5 to the buffer 12 when the output of the port mode control register 2 is logic "0" and logic "1", respectively.

The AND gate 9 and the inverter 10 transmits a signal externally applied to the I/O terminal 6 to the internal bus 1 through the gate G3. The OR gate 11 applies an output of logic "1" to a control terminal of the three-state buffer 12 when an output of the port mode control register 2 is logic "1" or when an output of the mode register 3 is logic "0", and applies an output of logic "0" to the control terminal of the three-state buffer 12 when an output of the port mode control register 2 is logic "0" and an output of the mode register 3 is logic "1". The three-state buffer 12 serves as a buffer when the signal applied to the control terminal is logic "1", and is set in a high-impedance (open) state when the signal applied to the control terminal is logic "0".

The control terminals of the gates G1 through G5 receive a write signal 20, a write signal 21, a read signal 22, a write signal 23, and a read/write signal 24, respectively. The write signals 20, 21, and 23 open the gates G2 and G4 to write data in the port mode control register 2, the port mode register 3, and port register 4, respectively. The read signal 22 opens the gate G3 to read data externally supplied through the I/O terminal 6.

The read/write signal 24 opens the gate G5 to write data into or read data from a plurality of registers in the pulse generator 5.

As shown in FIG. 4, the pulse generator 5 comprises a timer 50, compare registers 51 and 52, and a RS flip-flop 53. An output from the flip-flop 53 is supplied to the input terminal 7. When a trigger signal is supplied to the input terminal 7, the timer 50 initiates counting clock pulses O. When a count value of the timer 50 reaches a preset value in the compare register 51, the output of the compare register 51 sets the flip-flop 53. As a result, a Q output of the flip-flop 53 assumes logic "1". When the count value of the timer 50 reaches a preset value in the compare register 52, the output of the compare register 52 resets the flip-flop 53. Thus, the Q output of the flip-flop 53 assumes logic "0".

An operation of the microprocessor shown in FIGS. 3 and 4 will now be described, with reference to FIGS. 5A through 5C.

When the I/O terminal 6 is used in the output mode, a control section not shown controls the write signal 20 to open the gate G1 and sets data "0" in the port mode control register 2, controls the write signal 21 to open the gate G2 and sets data "0" in the mode register 3, controls the write signal 23 to open the gate G4, and sets desired output data in the port register 4.

The OR gate 11 outputs a logic "1" signal to turn on the buffer 12. The selector 8 supplies an output from the port register 4 to the buffer 12. As a result, the output data set in the port register 4 is output through the I/O terminal 6.

When the I/O terminal 6 is used in the input mode, the control section (not shown) controls the write signal 20 to open the gate G1, sets data "0" in the port mode control register 2, and controls the write signal 21 to open the gate G2 and sets data "1" in the mode register 3. The OR gate 11 outputs a logic "0" signal to set the buffer 12 in the open state. The control section sets the read signal to logic "1" to open the AND gate 9 and the gate G3. Then, data supplied externally through the I/O terminal 6 is transmitted to the internal bus 1 through the AND gate 9, the inverter 10, and the gate G3.

When the I/O terminal 6 is used in the pulse output mode, the control section (not shown) controls the write signal 20 to open the gate G1 and sets data "1" in the port mode control register, controls the read/write signal 24 to open the gate G5, and sets values in the compare registers 51 and 52. The OR gate 11 outputs a logic "1" signal to turn on the buffer 12, and the selector 8 selects an output from the pulse generator 5. In this state, when the trigger signal, as shown in FIG. 5B, is supplied to the terminal 7, the timer 50 initiates counting of the clock pulse O. The counted value gradually increases, as shown in FIG. 5A. When the counted value of the timer 50 reaches a preset value in the compare register 51, the flip-flop 53 is set and its Q output becomes logic "1", as shown in FIG. 5C. Further, when the counted value of the timer 50 reaches a preset value in the compare register 52, its Q output becomes logic "0".

Normally, a pulse signal is output from the I/O terminal 6 in the above described manner. However, there is a case where the voltage of the terminal 6 must be fixed at a high or low level independent of the state of the output pulse due to causes such as a system operation and a program execution.

FIGS. 6A through 6C and 7A through 7C show an example where a voltage of the terminal 6 is fixed at a high level. FIGS. 6A through 6C show a case where the pulse output from the terminal 6 remains at a high level independent of the externally supplied trigger signal, and FIGS. 7A through 7C show a case where the pulse output from the terminal 6 remains at a high level until the subsequent trigger signal is output. It should be noted that in FIGS. 6C and 7C, the solid line represents a voltage of the terminal 6, and a broken line represents the output of the pulse generator 5.

An operation for fixing the voltage of the terminal 6 is performed as follows:

First, the control section writes desired data in the port register 4, writes data "0" in the port mode control register 2 to set the port mode, and writes data "0" in the port mode register 3 to set the output mode. The above method is described in detail in the user's manual of the single chip microcomputer 78K/III or 78K/VI available from NEC Corporation (Registered Trademark), Japan.

As described above, in order for the control section to directly control the voltage of the functionally multiplexed terminal, predetermined data must be written in the port mode control register 2 and the port mode register 3 so as to change the mode of the terminal 6 from the pulse output mode to the output port mode. Further, the desired data must be written in the port register 4. These operations are cumbersome and time-consuming, with the result that it is difficult to switch the multiplexed function at high speed.

SUMMARY OF THE INVENTION

An object of the present invention is to provide a microprocessor having a functionally multiplexed terminal a voltage of which can be set at an arbitrary level both easily and at high speed.

Another object of the present invention is to provide a terminal voltage control circuit which can set a voltage of an input and output terminal at an arbitrary level by way of a program while an operation mode of the functionally multiplexed terminal remains in a pulse output mode.

In order to achieve the above object, according to a first aspect of the present invention, a microprocessor having a functionally multiplexed terminal comprises a terminal which functions as a port terminal and a pulse circuit terminal; a port mode control register for storing data designating that the terminal should function as the port terminal or the pulse circuit terminal; a port register for holding data to be output externally; a pulse circuit for outputting a pulse signal; selector means coupled to the terminal, the port register and the pulse circuit, for, in response to an output from the port mode control register, selecting and supplying one of the outputs from the port register and the pulse circuit to the terminal; and switching means, coupled to the selector means, reset by a signal for writing data in the port register, to cause the selector means to select the output from the port register regardless of the output from the port mode control register.

According to a second aspect of the present invention, a semiconductor integrated circuit having a functionally multiplexed terminal comprises a terminal functioning as a port terminal and a pulse circuit terminal; mode setting means for setting the terminal to function as the port mode terminal or the pulse circuit terminal; a port register for holding data to be output externally; a pulse circuit for outputting a pulse signal; selector means, coupled to the terminal, the mode setting means, the port register, and the pulse circuit, for, in response to the mode setting means, selecting and supplying one of the outputs of the port register and the pulse circuit to the terminal; switching means coupled to the selector means and set by writing data in the port register, for causing the selector means to select the output from the port register regardless of the setting by the mode setting means; and control means coupled to the port register and the switching means for, when a voltage of the terminal must be fixed at a predetermined voltage while the mode setting means sets the terminal at function as the pulse circuit terminal, writing data in the port register to thereby set the switching means. These changes can be made arbitrarily.

According to the above arrangement, a voltage of the terminal can be set or fixed at an arbitrary level without changing the contents of the port mode control register for determining the operation mode of the terminal or the mode setting means.

BRIEF DESCRIPTION OF THE DRAWINGS

FIG. 2 is a block diagram showing an arrangement of a microprocessor according to a second embodiment of the present invention;

FIG. 4 is a block diagram showing an arrangement of a pulse circuit shown in FIG. 3;

FIGS. 5A through 5C are waveforms of a count value of a timer, a trigger signal, and a pulse output, respectively;

FIGS. 6A through 6C are waveforms of a count value of a timer, a trigger signal, and a pulse output, respectively, in which a solid line and a broken line shown in FIG. 6C represent a normal output and a forcibly set signal, respectively;

FIGS. 7A through 7C are waveforms showing a count value of a timer, a trigger signal, and a pulse output, respectively, in which a solid line and a broken line shown in FIG. 7C represent a normal output and a forcibly set signal, respectively.

DETAILED DESCRIPTION OF THE PREFERRED EMBODIMENTS

An embodiment of the present invention will now be described, with reference to the accompanying drawings.

Figure 1:
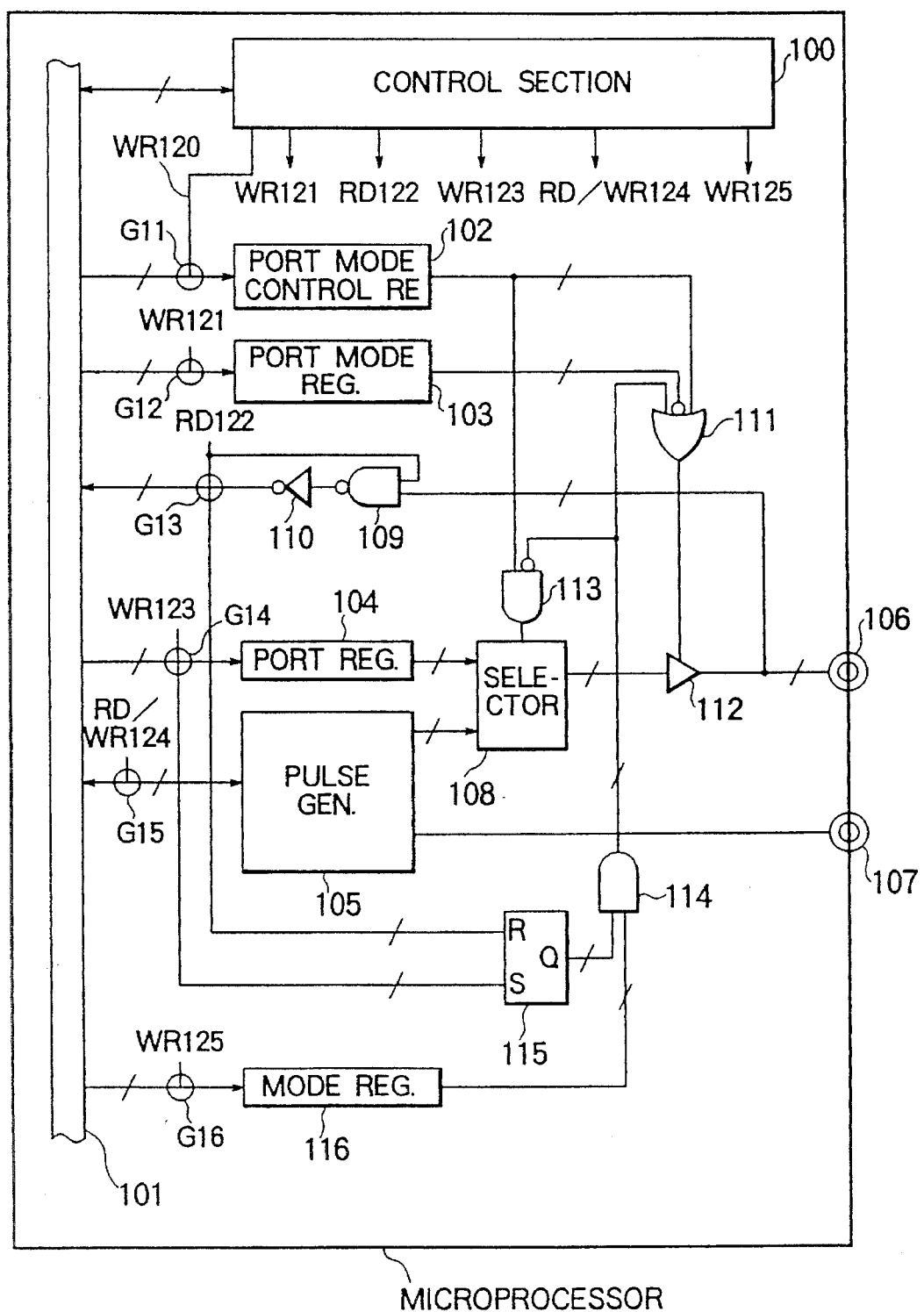
FIG. 1 is a block diagram showing an arrangement of a microprocessor according to a first embodiment of the present invention.
Figure 3:
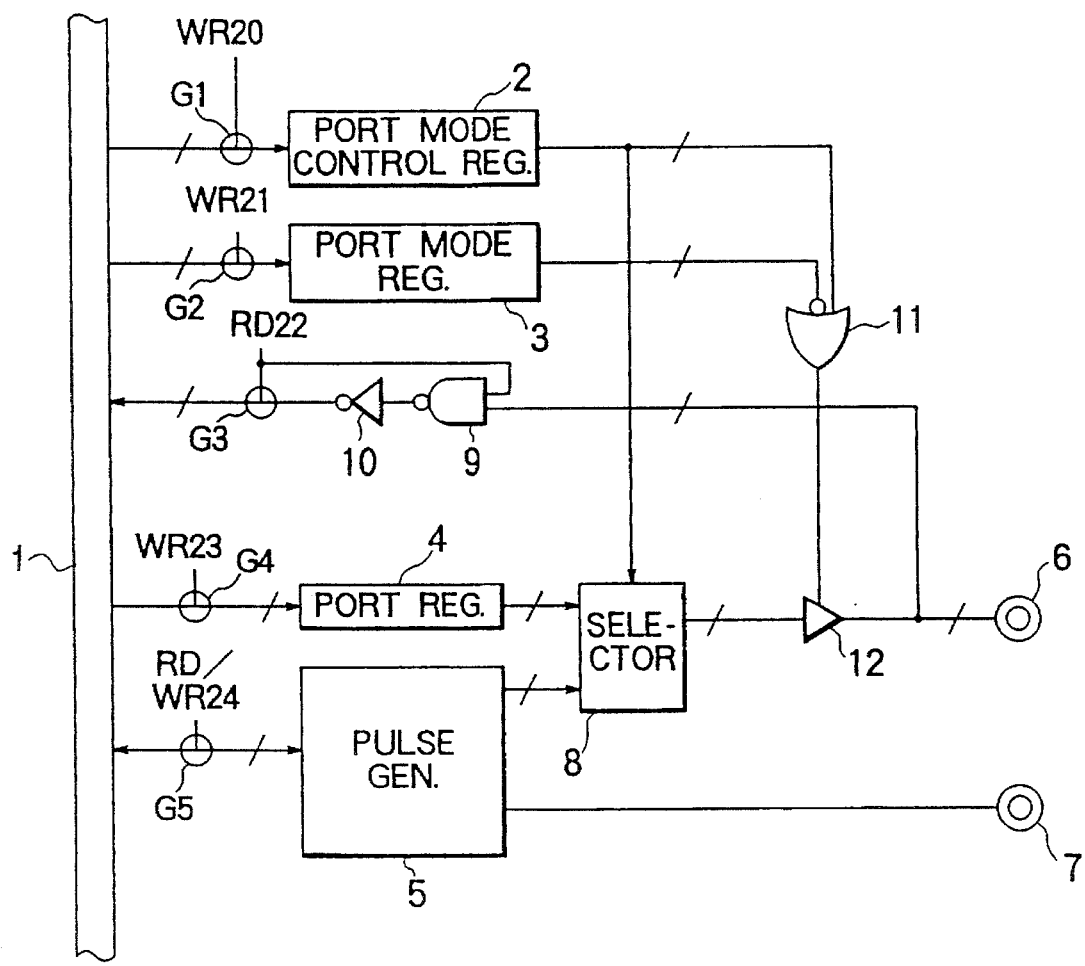
FIG. 3 is a block diagram showing an arrangement of a conventional microprocessor.

FIG. 1 shows an arrangement of a microprocessor according to an embodiment of the present invention, and specifically shows an internal arrangement of a microprocessor a common terminal of which is shared by a pulse circuit and an input and output (I/O) port.

This microprocessor includes a control section (CPU) 100, an internal bus 101, a port mode control register 102, a port mode register 103, a port register 104, a pulse generator 105, an input and output (I/O) terminal 106, an input terminal 107, a selector 108, NAND gate 109, and AND gates 113, and 114, an inverter 110, an OR gate 111, a three-state buffer 112, a flip-flop 115, a mode register 116, and gates G11 through G16. The above constituent elements are provided according to the number of required bits.

The control section 100 executes a program, outputs data through an output port, inputs data through an input port, and controls a pulse circuit for outputting a pulse signal outside the processor. More specifically, the control section 1 supplies, in accordance with a program, write signals 120 and 121, a read signal 122, a write signal 123, a read/write signal 124, a write signal 125 to the control terminals of the gates G11 through G16, respectively, to set data in the port mode control register 102, the port mode register 103, the port register 104, the compare registers in the pulse circuit 105, and the mode register 116. An internal bus 101 transfers data supplied to and from the control section 100.

The port mode control register 102 is used to set the I/O terminal 106 in a port mode (a mode in which as an output terminal functions the I/O port) or a pulse output mode (a mode in which it functions as an output terminal of the pulse generator 105). The I/O terminal 106 is set in the port mode and the pulse mode when an output from the port mode control register 102 is logic "0" and logic "1", respectively.

The output from the port mode control register 102 is supplied to the AND gate 113. An inverted input terminal of the AND gate 113 receives an output from an AND gate 114, to be described later.

An output from the AND gate 113 is supplied to a control terminal of the selector 108. The port mode register 103 sets the I/O terminal 106 bit by bit in the input mode or the output mode when the I/O terminal 106 is set in the port mode. Each bit in the I/O terminal 106 is set in the output mode and the input mode when the corresponding bit of the port mode register is logic "0" and logic "1", respectively.

The port register 104 holds data to be output externally. The pulse generator 105 has an arrangement as shown in FIG. 4, and generates a pulse having an arbitrary pulse width.

The I/O terminal 106 functions as an I/O terminal of the I/O port and an output terminal for a pulse from the pulse generator 105.

The input terminal 107 receives a trigger signal which is supplied to the pulse generator 105. The input terminal 107 is also functionally multiplexed; however, a detailed description thereof is omitted.

The selector 108 supplies outputs from the port register 104 and the pulse generator 105 to the buffer 112 when an output from the AND gate 113 is logic "0" and logic "1", respectively. The AND gate 109 and the inverter 110 transmit data supplied externally through the I/O terminal 106 to the internal bus 101 through the gate G13. The OR gate 111 supplies a logic "1" output to the buffer 112 when the output from the port mode control register 102 is logic "1", or when the output from the AND gate 114 is logic "1".

The three-state buffer 112 functions as a normal buffer circuit, and is set in a high-impedance (open) state when a signal supplied to its control terminal is logic "1", and logic "0", respectively.

The flip-flop 115 is set by the write signal 123 and is reset by the read signal 122. A mode register 116 is used to enable or disable a Q output from the flip-flop 115. The Q output from the flip-flop 115 and an output from the mode register 116 are supplied to the AND gate 114. An output from the AND gate 114 is supplied to the OR gate 111, as well as to an inverted terminal of the AND gate 113.

The control section 100 supplies the write signals 120 and 121, the read signal 122, the write signal 123, the read/write signal 124, and the write signal 125 to the control terminals of the gates G11 through G16, respectively.

The write signals 120, 121, 123, and 125 are control signals for opening the gates G11, G12, G14, and G16 to write data in the port mode control register 102, the port mode register 103, the port register 104, and the mode register 116, respectively. The read signal 122 is a control signal for opening the gate G13 to input data externally supplied through the I/O terminal 106. The read/write signal 124 is a control signal for opening the gate G15 to write data into or read data from the compare registers in the pulse generator 105.

An operation of a microprocessor according to the embodiment will now be described, with reference to FIG. 1.

When the I/O terminal 106 is used in the output port mode, the control section 100 controls the write signal 120 to open the gate G11, sets data "0" in the port mode control register 102, controls the write signal 121 to open the gate G12, sets data "0" in the mode register 103, and controls the write signal 123 to open the gate G14, and sets data to be output in the port register 104. The OR gate 111 outputs logic "1" and the three-state buffer 112 outputs the input signal. The AND gate 113 supplies the logic "0" signal to the control terminal of the selector 108, and the selector 108 supplies an output from the port register 104 to the buffer 112. In this way, the output data set in the port register 104 is output through the I/O terminal 106.

When the I/O terminal 106 is used in the input and output mode, the control section 100 controls the write signal 120 to open the gate G11 and sets data "0" in the port mode control register 102, controls the write signal 121 to open the gate G12, and sets data "1" in the mode register 103. In the initial state, the flip-flop 115 is reset, and therefore the AND gate 114 outputs a logic "0" signal. As a result, the OR gate 11 outputs a logic "0" signal and an output terminal of the buffer 112 is in an open state.

Then, the control section 100 sets the read signal 122 at logic "1", and the AND gate 109 and the gate G13 are opened, so that the data supplied through the I/O terminal 106 is supplied to the control section 100 through the AND gate 109, the inverter 110, the gate G13, and the internal bus 101.

When the I/O terminal 106 is operated in the pulse output mode, the control section 100 controls the write signal 120 to open the gate G11 and sets data "1" in the port mode control register 102, and also controls the read/write signal 124 to open the gate G15, and sets values in the compare registers 51 and 52. In accordance with the output from the port mode control register 102, the OR gate 111 outputs the logic "1", whereby the buffer 112 is turned on. Further, the flip-flop 115 remains in the reset state. Thus, the output from the AND gate 114 becomes logic "0". As a result, the output from the AND gate 113 becomes logic "1" and the selector 108 transmits the output from the pulse generator 105 to the buffer 112.

In this state, when the trigger signal, as shown in FIG. 5B, is supplied to the input terminal 107, the timer 50 initiates counting the clock pulse O and thus the counted value gradually increases as shown in FIG. 5A. When the counted value of the timer 50 reaches a preset value in the compare register 51, the flip-flop 53 is reset, and the Q output thereof becomes logic "1", as shown in FIG. 5C. When the counted value of the timer 50 reaches the value set in the compare register 52, the flip-flop 53 is reset and the Q output thereof becomes logic "0". As a result, the pulse signal is output from the I/O terminal 106.

When the voltage level of the I/O terminal 106 is fixed at a constant level independent of the state of the output signal from the pulse generator 105, the control section 100 writes the control signal 125 to open the gate G16, and sets logic "1" in the mode register 116 preliminarily, for example, when the microprocessor is powered (or at a time when the voltage of the terminal 106 has to be fixed).

At a time when the voltage of the terminal 106 must be fixed, the control section 100 controls the write signal 123 to open the gate G14, and writes data to be output in the port register 104. The write signal 123 sets the flip-flop 115, and the Q output thereof assumes a logic "1" level. As a result, the output from the AND gate 114, as well as the output from the OR gate, assumes logic "1". Accordingly, the three-state buffer 112 is turned on.

Further, in response to the logic "1" signal from the AND gate 114, the output from the AND Gate 113 assumes logic "0".

Therefore, the selector 108 supplies the output from the port register 104 to the I/O terminal 106 through the buffer 112.

Accordingly, the voltage of the I/O register 106 is determined in accordance with the content of the port register 104, independent of the output from the pulse generator 105.

As described above, the voltage of the I/O terminal can be set or fixed at an arbitrary level without programming the port mode control register 102.

The flip-flop 115 is reset by setting the read signal 122 at a logic "1" level. As a result, the output from the AND gate 114 assumes a logic "0" level and the output from the AND gate 113 assumes a logic "1" level. Accordingly, the selector 108 selects and supplies the output from the pulse generator 105 to the I/O terminal 106. In this case, an operation of activating the read signal 122 is significant and the read out data itself has no significance.

It should be noted that the voltage of the I/O terminal 106 may be fixed at an arbitrary level by writing desired data in the port register 104, and setting data "0" and "1" in the port mode control register 102 and the port mode register 103, respectively.

It should also be noted that the mode register 116 has a function of enabling and disabling the terminal voltage fixing method according to the embodiment. For example, the setting data "0" in the mode register 116 always set the output from the AND gate 114 to logic "0", and thus the output from the flip-flop 115 is ignored.

A second embodiment of the present invention will now be described with reference to FIG. 2.

In FIG. 2, the same reference numerals are used to denote the same parts as in FIG. 1, and thus description thereof will be omitted. In this embodiment, the microprocessor is provided with similar elements as in the case of the microprocessor of FIG. 1, namely, the control section 100, the internal bus 101, the port mode control register 102, the port mode register 103, the port register 104, the pulse generator 105, the I/O terminal 106, the input terminal 107, the selector 108, the AND gates 109, 113, and 114, the inverter 110, the OR gate 111, the three-state buffer 112, the flip-flop 115, the mode register 116, and gates G11 through G16.

The second embodiment differs from the first embodiment in that the flip-flop 115 is reset not by the read signal 122 but by the trigger signal supplied to the pulse generator 105 through the input terminal 107 from the outside. Other constituent elements and their operations are same as those of the first embodiment shown in FIG. 1.

In order to implement the above described reset operation of the flip-flop 115, logic "1" data must be preliminarily set in the mode register 116.

According to the arrangement of the second embodiment, the flip-flop 115 is reset by the trigger signal supplied through the input terminal 107, the signal represented by the solid line in FIG. 7C can be output without programming the port mode control register.

As has been described above, according to the present invention, a voltage level of the I/O terminal can be arbitrarily set while the I/O terminal is set in the pulse output mode.

The present invention is not limited to the above embodiments.

For example, in the first and second embodiments, the flip-flop 115 is reset by the read signal 123 or the trigger signal. However, the flip-flop 115 may be reset by other signals. Further, the detailed arrangements are not limited to those shown in FIGS. 1 and 2. For example, the use of a NAND gate in place of the AND gate will change the inverted input terminals of the OR gate 111 and the AND gate 113 to positive input terminals. These changes can be made arbitrarily.

What is claimed is:

1. A microprocessor having a functionally multiplexed terminal, comprising:

a terminal selectively operable in a plurality of port modes for functioning as a port terminal in a first port mode and a pulse circuit terminal in a second port mode;

a port mode control register for storing data designating port mode of said terminal and outputting a mode selection signal;

a port register for holding data to be output externally;

a pulse circuit for outputting a pulse signal;

selector means coupled to the terminal, the port register, and the pulse circuit, for, in response to an output from the port mode control register, selecting a port mode of said terminal based on said mode selection signal and supplying the output of said port register when said first mode is selected and supplying the output of said pulse circuit when said second mode is selected;

switching means for forcing said terminal to said first mode to supply the output from said port register regardless of the output from said port mode control register, said switching means being coupled to said selector means and being activated by a write command signal for writing data in said port register; and enabling means, coupled to said switching means, for enabling and disabling said switching means.

2. The microprocessor according to claim 1, further comprising control means coupled to the port register and the switching means, for, when a voltage of the terminal must be fixed at a predetermined voltage while the port mode control register is holding data designating that the terminal should function as the pulse circuit terminal, writing data corresponding to the predetermined voltage in the port register to thereby set the switching means.

3. The microprocessor according to claim 1, wherein the switching means comprises:

a flip-flop set by a signal for writing data in the port register;

register means for holding predetermined data for disabling an output from the flip-flop; and an AND gate for ANDing the output from the flip-flop and an output from the register means and supplying the ANDed result to the selector means.

4. The microprocessor according to claim 1, further comprising means for reading data externally supplied to the terminal.

5. A semiconductor integrated circuit having a functionally multiplexed terminal, comprising:

a terminal selectively operable in a plurality of port modes for functioning as a port terminal in a first port mode and a pulse circuit terminal in a second port mode;

mode setting means for selectively setting one of said first and second port modes for outputting a mode selection signal;

a port register for holding data to be output externally;

a pulse circuit for outputting a pulse signal;

selector means, coupled to the terminal, the mode setting means, the port register, and the pulse circuit, for, in response to the mode setting means, selecting one of said first and second port modes based on the mode selection signal from said mode setting means and supplying one of the outputs of the port register and the pulse circuit to the terminal;

switching means, coupled to the selector means and set by writing data in the port register, for forcing the selector means to select said first mode to output from the port register regardless of the setting by the mode setting means, said switching means comprising:

a flip-flop set by writing data in the port register;

register means for holding data for enabling or disabling an output from said flip-flop: and means for in response to an output from the register means, controlling and supplying the output from the flip-flop to the selector means; and control means coupled to the port register and the switching means for, when a voltage of the terminal must be fixed at a predetermined voltage while the mode setting means is set to select the second port mode for operating said terminal as the pulse circuit terminal, writing said predetermined voltage in the port register and switching the terminal to said first mode to output on the terminal said predetermined voltage.

6. The semiconductor integrated circuit according to claim 5, further comprising means for reading data externally supplied to the terminal.

7. The semiconductor integrated circuit according to claim 5, further comprising means for reading data supplied externally to the terminal and wherein the flip-flop is reset in response to the means for reading.

8. The semiconductor integrated circuit according to claim 5, wherein the flip-flop is reset in response to an externally supplied signal.

9. A semiconductor integrated circuit having a functionally multiplexed terminal, comprising:

first holding means for holding a first output signal;

second holding means for holding a second output signal;

a terminal for selectively and externally outputting one of the first and second output signals;

selecting means, coupled to the first and second holding means and the terminal, for supplying a selected one of the first and second output signals to the terminal;

mode control means, coupled to the selecting means, for designating one of said first and said second output signals to the terminal to be selected by the selecting means;

switching means for forcing a voltage of the terminal to a predetermined voltage regardless of the designation by the mode control means; and enabling means, coupled to said switching means, for enabling and disabling said switching means.

10. The semiconductor integrated circuit according to claim 9, wherein the first holding means comprises a port register for holding data to be externally output and the second holding means comprises a pulse circuit for outputting a pulse signal.

11. The semiconductor integrated circuit according to claim 9, wherein the switching means comprises:

a flip-flop set in response to the writing of data into the first holding means;

register means for holding data for enabling or disabling an output from the flip-flop; and means for, in response to an output from the register means, controlling and supplying the output from the flip-flop to the selecting means.

12. The semiconductor integrated circuit according to claim 9, further comprising means for reading data externally supplied to the terminal.

13. The semiconductor integrated circuit according to claim 11, further comprising means for reading data externally supplied to the terminal and wherein the flip-flop is reset in response to the reading of data by the reading means.

14. The semiconductor integrated circuit according to claim 11, wherein the flip-flop is reset in response to a signal externally supplied to the terminal.

15. A semiconductor integrated circuit having a functionally multiplexed terminal, comprising:

a terminal functioning as a port terminal and a pulse circuit terminal;

mode setting means for selectively setting the terminal to function as the port terminal or the pulse circuit terminal;

a port register for holding data to be externally output;

a pulse circuit for outputting a pulse signal;

selector means coupled to the terminal, the mode setting means, the port register, and the pulse circuit, for, in response to the mode setting means, selecting and supplying one of the outputs from the port register and the data holding means to the terminal;

a flip-flop set in response to the writing of data in the port register;

a mode register;

an AND gate for ANDing the outputs from the flip-flop and the mode register;

means for causing the selector means to select the output from the port register or the output from the pulse circuit depending on the outputs from the mode setting means and the AND gate; and control means for, when a voltage of the terminal has to be fixed to a predetermined voltage while the mode setting means has the terminal set to function as the pulse circuit terminal, writing data in the port register to thereby fix the voltage of the terminal to a voltage corresponding to the data set in the port register without changing the designation by the mode setting means.

* * * * *